US006623185B1

(12) United States Patent
Peragine

(10) Patent No.: US 6,623,185 B1
(45) Date of Patent: Sep. 23, 2003

(54) LOSS OF SIGNAL DETECTOR FOR LOW-LEVEL OPTICAL SIGNALS

(75) Inventor: Frank J. Peragine, Fair Haven, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 530 days.

(21) Appl. No.: 09/595,782

(22) Filed: Jun. 16, 2000

(51) Int. Cl.[7] .................. H04B 10/08; H04B 10/06; H04B 17/00
(52) U.S. Cl. .................. 398/26; 398/24; 398/25; 398/33; 398/2.2; 375/227
(58) Field of Search .................. 359/110, 111, 359/189; 714/703, 704; 375/227, 285, 346

(56) References Cited

U.S. PATENT DOCUMENTS

| 5,563,893 A |   | 10/1996 | Lai ........................ 376/1 |
| 6,178,025 B1 | * | 1/2001 | Hardcastle et al. .......... 359/177 |
| 6,285,475 B1 | * | 9/2001 | Fee ........................ 359/110 |
| 6,480,315 B1 | * | 11/2002 | Brown ..................... 359/189 |

OTHER PUBLICATIONS

"TRU–050—The Complete PLL Solution," Product Data Sheets, undated, available at http://www.vectron.com/products/cdr/tru050.htm, 17 pages.

* cited by examiner

Primary Examiner—Leslie Pascal
Assistant Examiner—M. R. Sedighian

(57) ABSTRACT

Amplified noise signals in an optical communication system can be advantageously used to detect an LOS condition for particular wavelengths of interest. The disclosed method includes generating a sampling window of suitable size and counting the number of transitions in the amplified noise signal that occur during the sampling window. If no transitions occur in a sampling period, then true data is assumed to be present. On the other hand, if transitions occur more frequently than during the period when data are present, an LOS event is deemed to have occurred and an appropriate signal is generated.

In another aspect, the disclosed method uses a Clock and Data Recovery (CDR) circuit and adds simple digital logic circuits to detect an LOS condition in a predetermined sampling window.

10 Claims, 2 Drawing Sheets

LOSS OF SIGNAL DETECTOR FOR LOW-LEVEL OPTICAL SIGNALS

TECHNICAL FIELD

The present invention is related in general to devices used in opto-electronic applications, and, in particular, to a loss-of-signal (LOS) detector for optical signals.

BACKGROUND

Optical communication systems typically include optical receivers to receive an incoming optical signal from a channel, and convert the incoming optical signal into a current signal, which is amplified by electronic amplifiers. One way of measuring the performance of such an optical communication system is to measure the true loss of signal (LOS) event in the channel. A typical optical receiver may include an LOS detector.

A method of measuring a true LOS event is described in U.S. Pat. No. 5,563,893 to Lai ("Lai"). Lai teaches a digital LOS detector having a trough circuit and a smearing circuit. The trough circuit generates a logic output whenever an incoming communication signal is within a predefined voltage range. The output of the trough circuit is applied to the smearing circuit, which generates an LOS output whenever the output of the trough circuit remains at a predefined logic level for a predetermined length of time. In a second embodiment, a state machine is coupled to the output of the smearing circuit, the trough circuit, and a clock, the state machine generating the LOS indication if the output from the smearing circuit remains at the predetermined logic level for at least a predetermined number of clock cycles.

In general, an optical communication system uses an Optical Supervisory Channel (OSC) to carry monitoring and control information. The OSC—which in the case of Dense Wavelength Division Multiplexing (DWDM) Synchronous Optical Network (SONET) is selected to have a wavelength of 1310 nm, 1480 nm, 1510 nm, or between 1610 and 1620 nm—is usually a separate channel from the data channels. Some optical amplifiers do not amplify signals at certain wavelengths such as those typically assigned to the OSC at 1510 nm, thereby resulting in loss-limited channels. In cases where the signal level is low, the known systems do not detect a true LOS event consistently and accurately. Accordingly, there is a need for an improvement in the art.

SUMMARY

The present disclosure is directed to a method that advantageously uses certain observed patterns in amplified noise signals to determine an LOS condition in a loss-limited channel at an OSC wavelength or other wavelengths of interest. In one aspect, the disclosed method includes generating a sampling window of suitable size and counting the number of noise signal transitions that occur during the sampling window. If no transitions occur in a sampling window, then true data is assumed to be present during the sampling window. On the other hand, if transitions occur during the sampling window at a predetermined frequency, an LOS event is deemed to have occurred and an appropriate signal is generated. In another aspect, the transitions are counted and filtered, and if transitions exceed a predetermined number, an LOS condition is indicated.

In another aspect, the disclosed method uses a Clock and Data Recovery (CDR) circuit and adds simple digital logic circuits to detect an LOS condition in a predetermined sampling window. In a yet another aspect, the disclosure is directed toward a digital circuit including a window-detector circuit and a CDR circuit, which are coupled to an additional circuit to provide a sampling window. The window-detector circuit outputs a signal indicating an LOS condition if a predetermined number of transitions occur during a sampling window. In a further aspect, any LOS signal output by a conventional CDR circuit is logically OR'ed with the output of the window-detector circuit so that an LOS event is detected in either situation—where a conventional low-gain optical receiver is used, or where a full swing transitions may not be present with sufficient frequency to detect an LOS event.

BRIEF DESCRIPTION OF THE DRAWINGS

These and other features, objects and advantages of the present invention are more readily understood from the following detailed description of the presently preferred embodiments and the appended claims with a reference to the accompanying drawings, where like numbers designate like parts, and wherein:

DETAILED DESCRIPTION

A solution for the problem with loss-limited channels is to use a high output power transmitter at the head end and a highly sensitive receiver-amplifier to receive and amplify signals at a wavelength of interest, for example, at OSC wavelength of 1510 nm. This process results in an amplified signal as well as a highly amplified noise component, which can be measured for transitions to detect an LOS event.

More specifically, it has been observed that transitions occur at a higher rate in a channel during LOS conditions than when data signals present, which transitions can be detected and counted to indicate an LOS condition.

In an optical communication system, an optical receiver receives optical signals from an optical medium such as an optical fiber and generates a current signal representative of the optical energy of the optical signals in the optical fiber. An amplifier stage coupled to the optical receiver—typically, a trans-impedance amplifier—receives the current signal and generates a voltage signal representative of the current signal.

Figure 1:
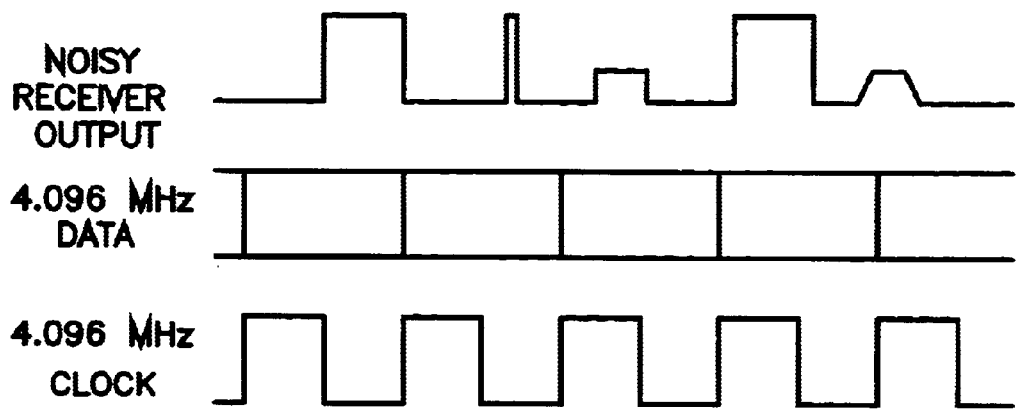
FIG. 1 shows the output of a noisy optical receiver with no input data.

FIG. 1 shows the output of a highly sensitive receiver coupled to a trans-impedance amplifier when no data signals are present. In an illustrative scenario, this receiver-amplifier has a sensitivity of about −45 dBm to −48 dBm at a Bit Error Rate (BER) of $10^{-10}$. FIG. 1 also shows a 4.096 MHz data signal and a 4.096 MHz timeslot clock for reference. It should be noted that where no data signals are present, the output of the receiver amplifier constitutes primarily of a noise component with full swing transitions and low transition density. It has also been observed that these noise transitions are at a high rate compared to a normal bit rate clock signal. Further, the noise component is discovered to be asynchronous with the clock signal. In one embodiment, these high rate noise transitions during the absence of data signals are advantageously used to detect a true loss-of-signal (LOS) event.

Typically, a data signal that propagates over long lengths of fiber or that which traverses through multiple stages of switch fabric becomes degraded. Such a degraded data signal can be recovered using a device such as a Clock and Data Recovery (CDR) circuit, which in a simplest form can be any filter circuit such as a band-pass filter or a Phase Locked Loop (PLL). In general, a CDR circuit—which can be purchased off-the-shelf from various vendors in a hermetically sealed package—reshapes and retimes this degraded data signal. A CDR circuit typically includes a phase detector, a loop filter and a voltage-controlled oscillator (VCO) to recover the degraded signal. Three designs of CDR circuit are commercially available—a Surface Acoustic Wave (SAW) filter configuration; a Voltage-Controlled Crystal Oscillator (VCXO) configuration that includes a PLL; or an all silicon VCO configuration.

Some commercially available CDR circuits are configured to recover and retime a degraded signal without the need for additional circuits. Such commercial CDR circuits typically include LOS detection capability, but they are not configured to work with a highly sensitive receiver to receive and amplify certain signals—for example, the Optical Supervisory Channel (OSC) signals and others—that are typically not amplified by a conventional receiver. Accordingly, in an aspect, the present disclosed method is directed to those devices that are incapable of detecting an LOS event in such and other conditions as well.

Figure 2:
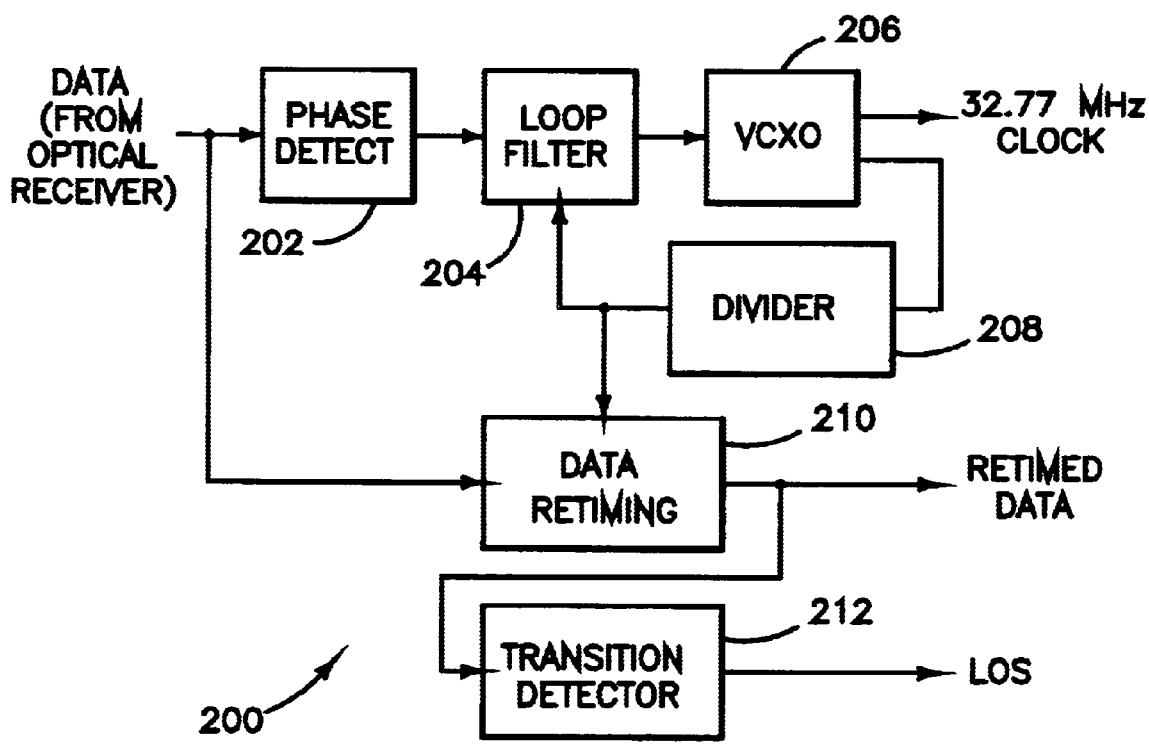
FIG. 2 (PRIOR ART) depicts an example of a conventional clock and data recovery circuit.

Referring to FIG. 2 (PRIOR ART), a conventional CDR circuit includes a VCXO 206 to which an incoming digital data signal is fed via a phase detector 202 and a loop filter 204. The loop filter 204 is fed with voltage at a suitable frequency from a divider circuit 208. A data retiming circuit 210 retimes the incoming digital data signal, whereafter a transition detector 212 detects transitions (more precisely, lack of transitions) to indicate an LOS event.

In general, a conventional CDR circuit might be designed to provide an LOS indication if data transitions are not detected in a 256 time-slot interval. Such a transition detector is not particularly useful in the case described above, where a low bit rate signal at 4.096 MHz that is not typically subject to amplification by an optical amplifier that is configured to amplify only certain channels such as signal channels and not supervisory channels. In certain other embodiments, the CDR circuits do not provide an out-of-lock (OOL) indication. If these CDR circuits are configured with a clock source such as a VCXO in a PLL, circuit, detecting an OOL indication is difficult by monitoring the clock. FIG. 2 shows a high frequency VCXO operating at 32.77 MHz produces a clock signal that is divided down to a 4.096 MHz by an internal divider circuit 208.

In these and other situations, the noisy output of an optical receiver can be used to detect an LOS event. It has been discovered that a 32.77 MHz clock signal can be configured to provide at least one sampling window of suitable size in each timeslot and to examine if there are transitions in the data in that timeslot. It should be noted that the 32.77 MHz VCXO clock signal is present even during an LOS event. Additionally, because it is a crystal oscillator, the frequency does not change significantly from that in the locked state. Thus, in an embodiment, a consistent sampling window can be obtained by using a VCXO.

Figure 3:
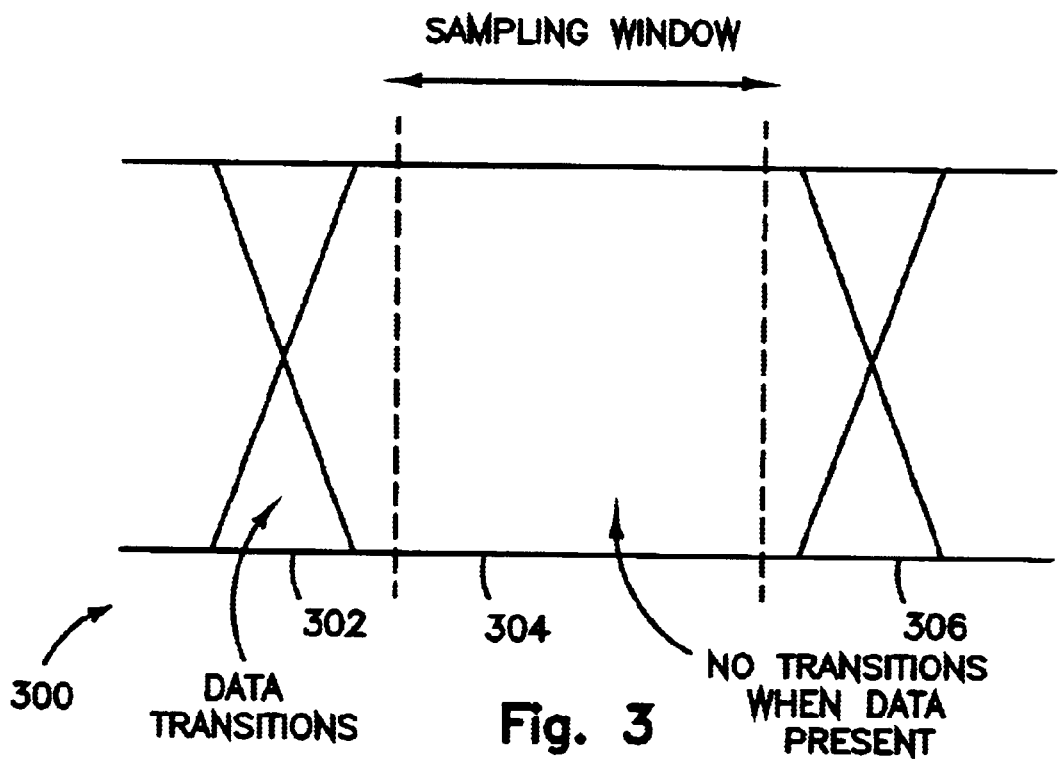
FIG. 3 depicts a detailed view of a sampling window.

Referring to FIG. 3, three sampling windows 302, 304 and 306 at about 4.096 MHz are shown. Note that the sampling window can be as wide as possible but should fit in a timeslot. FIG. 3 shows an illustrative embodiment where the window is selected to be at 4.096 MHz. As shown in window 304, when a true data signal is present, then no transitions are detected during that sampling window. In contrast, during sampling windows 302 and 306, frequent data transitions are detected, indicating that during these sampling windows 302 and 306, an LOS event occurred.

These data transitions can advantageously be counted, and if the number of transitions in a sampling window exceeds a pre-determined threshold number, an LOS indication is generated. In other embodiments, the data transitions are filtered and then counted to obtain a precise count.

Figure 4:
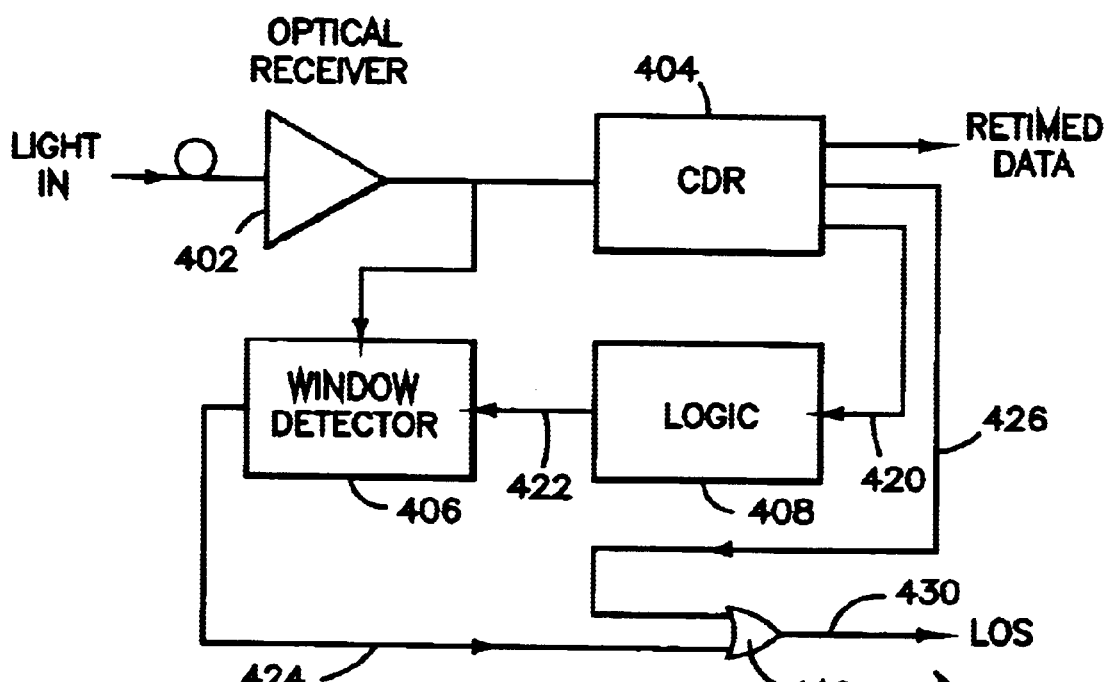
FIG. 4 is an embodiment of an LOS detector consistent with the principles of the present invention.

Referring to FIG. 4, an embodiment of an apparatus to detect an LOS event in a low-speed optical signal is shown. An optical receiver 402 is coupled to a CDR circuit 404, which provides a signal 420 to determine a sampling "window" signal 422 by using an appropriate logic circuit 408. The sampling window signal 422 is input to a window-detector circuit 406, which provides an output signal 424 representative of any transitions detected during the sampling window 422. This output signal 424 can be used to determine an LOS event.

As shown in FIG. 4, in an embodiment, the output of a transition detector inherent in a CDR circuit is advantageously used to provide a signal 426, which is fed to a first input terminal of a logical OR circuit 410. At a second input terminal of the logical OR circuit 410 is fed the output signal 424 of the window-detector circuit 406. This configuration advantageously covers the case of a low-gain optical receiver, in which case, the output of the CDR circuit 404 may provide an indication of a true LOS event. Further, the logical OR-ing of signals 424 and 426 is helpful in cases where full swing transitions are not detected with sufficient frequency during the sampling window in order to provide an adequate indication of an LOS event. This may happen, for example, during low-temperature operation, when noise signals do not make full swing transitions.

In an embodiment, the output of the logical OR circuit 410 is thereafter used to drive a retriggerable monostable multivibrator circuit (not shown in FIG. 4) whose output is a logic level that feeds an input line of a controller (not shown in FIG. 4). This is an illustrative—but not the only—method of counting transitions and converting to a logic level.

The foregoing describes an apparatus and method to detect LOS in low-level optical signals. Various additional modifications of this invention will occur to those of ordinary skill in the art without deviating from the spirit and scope of the invention. For example, though a VCXO-PLL CDR is described to illustrate the inventive principles, a Surface Acoustic Wave CDR, an all-silicon VCO CDR, and other configurations can be used to practice the invention. Additionally, other methods of counting signal transitions can be substituted for the illustrative methods described herein. Such deviations from the specific teachings of this specification that rely upon the principles disclosed and their equivalents through which the state of the art has been advanced are properly considered within the scope of the invention as claimed in the following.

What is claimed is:

1. A method of detecting a loss-of-signal condition in an optical communication system, comprising the steps of:
   creating a sampling window of suitable size;
   counting the number of noise signal transitions in the sampling window; and
   generating an LOS indication occurred based on the noise signal transitions in the sampling window.

2. The method of claim 1 wherein the step of generating an LOS indication further comprises the step of:

if the number of noise signal transitions exceeds a predetermined number, then producing a signal indicative of an LOS event.

3. An electronic circuit to determine an LOS event in an optical communication system, comprising:

an optical receiver to receive a first signal and to generate a second signal representative of the optical energy in the first signal;

an oscillator circuit coupled to the optical receiver to provide a clock signal generate a sampling window signal;

a window detector circuit operatively coupled to the oscillator circuit to receive the sampling window signal and to detect transitions in the second signal; and a counter circuit operatively coupled to the window-detector circuit to count the number of detected transitions in the second signal, wherein the counter circuit is configured to generate a third signal indicative of an LOS event if a predetermined number of transitions are detected in the second signal.

4. The electronic circuit of claim 3 wherein the oscillator circuit is a voltage-controlled crystal oscillator (VCXO), an all-silicon voltage-controlled oscillator (VCO) or a surface acoustic wave (SAW) filter-configured oscillator.

5. An electronic circuit to determine an LOS event in an optical communication system, comprising:

an optical receiver to receive a first signal and to generate a second signal representative of the optical energy in the first signal;

a clock and data recovery (CDR) circuit coupled to the optical receiver to provide a clock signal and to generate a sampling window signal;

a window detector circuit operatively coupled to the CDR circuit to receive the sampling window signal and to detect transitions in the second signal; and a counter circuit operatively coupled to the window-detector circuit to count the number of detected transitions in the second signal, wherein the counter circuit is configured to generate a third signal indicative of an LOS event if a predetermined number of transitions are detected in the second signal.

6. The electronic circuit of claim 5 wherein the CDR circuit further comprises a voltage-controlled crystal oscillator (VCXO), an all-silicon voltage-controlled oscillator (VCO) or a surface acoustic wave (SAW) filter-configured oscillator.

7. The electronic circuit of claim 5, wherein the optical receiver is a low-gain optical receiver and wherein the CDR circuit generates a fourth signal indicative of an LOS event.

8. The electronic circuit of claim 7, further comprising a logical OR circuit to which the third and the fourth signals are input, whereby an LOS event is detected either by the CDR circuit or by the window-detector circuit.

9. The electronic circuit of claim 5, wherein the CDR circuit generates a fourth signal indicative of an LOS event in a low-temperature operation in which full swing transitions in the second signal do not occur at a high frequency.

10. The electronic circuit of claim 9, further comprising a logical OR circuit to which the third and the fourth signals are input, whereby an LOS event is detected either by the CDR circuit or by the window-detector circuit.

* * * * *